United States Patent [19]

Ogawa et al.

[11] Patent Number: 5,544,995
[45] Date of Patent: Aug. 13, 1996

[54] ROTARY VALVE APPARATUS

[75] Inventors: Takashi Ogawa; Kazuo Yoshimoto; Kensuke Uchiyama, all of Hiratsuka; Harushige Ibe, Yokohama; Yoshiharu Arai, Yokohama; Taketoshi Shiraishi, Yokohama; Yoshinori Gotoh, Yokohama, all of Japan

[73] Assignees: Japan Tobacco Inc.; Mitsubishi Jukogyo Kabushiki Kaisha, Tokyo, Japan

[21] Appl. No.: 183,758

[22] Filed: Jan. 21, 1994

[30] Foreign Application Priority Data

Jan. 22, 1993 [JP] Japan ................................ 5-009080

[51] Int. Cl.⁶ ............................................. A24B 3/18
[52] U.S. Cl. ............................... 414/219; 222/368
[58] Field of Search .................... 414/219, 220, 414/189; 222/368, 218, 367, 370

[56] References Cited

U.S. PATENT DOCUMENTS

| | | | |
|---|---|---|---|
| 2,858,212 | 10/1958 | Durant et al. | 222/368 X |
| 2,933,208 | 4/1960 | Green | 414/220 |
| 3,610,476 | 10/1971 | Starrett | 414/220 X |
| 3,612,307 | 10/1971 | Vogt | 414/220 |
| 3,633,797 | 1/1972 | Graff | 222/368 X |
| 4,397,657 | 8/1983 | Selep et al. | 414/220 X |
| 4,462,740 | 7/1984 | Cytra | 414/220 |
| 5,020,550 | 6/1991 | Uchiyama et al. | 131/296 |
| 5,044,837 | 9/1991 | Schmidt | |

FOREIGN PATENT DOCUMENTS 4218094 12/1992 Germany.

*Primary Examiner*—Michael S. Huppert
*Assistant Examiner*—James W. Keenan

[57] ABSTRACT

A rotary valve apparatus comprises a rotor housing having an inlet and an outlet, a rotor rotatably fitted in the rotor housing, a plurality of pockets arranged at regular intervals in the circumferential direction on the outer peripheral surface of the rotor and adapted to be connected successively to the inlet and the outlet of the rotor housing as the rotor rotates, two communication ports arranged in separate regions extending from the inlet to the outlet of the rotor housing and from the outlet to the inlet, respectively, with respect to the rotating direction of the rotor, and pressure equalizing pipes for connecting one communication port in one region with the corresponding communication port in the other region. As the rotor rotates, the pockets moving from the inlet toward the outlet and the pockets moving from the outlet toward the inlet are subjected to two cycles of pressure equalization by means of one and the same equalizing pipe.

28 Claims, 11 Drawing Sheets

ROTARY VALVE APPARATUS

BACKGROUND OF THE INVENTION

1. Field of the Invention

The present invention relates to a rotary valve apparatus used for the supply and discharge of a material to and from a high-pressure container in processing the material in the container.

2. Description of the Related Art

An example of the valve apparatus of this type is disclosed in U.S. Pat. No. 5,020,550. This conventional valve apparatus comprises a rotor housing, which has a rotor bore defined therein, an inlet connected to, e.g., the atmosphere, and an outlet connected to a high-pressure container. The inlet and the outlet are separated in the diametrical direction of the rotor bore. A rotor is contained for rotation in the rotor bore of the rotor housing. The rotor has a plurality of pockets on its outer peripheral surface.

Further, the rotor housing has pressurization-side communication ports arranged at intervals in a region extending from the inlet to the outlet, with respect to the rotating direction of the rotor, and depressurization-side communication ports arranged at intervals in a region extending from the outlet to the inlet. The corresponding communication ports on the pressurization and depressurization sides communicate with one another by means of equalizing pipes.

As the rotor rotates, each pocket of the rotor is connected to the inlet, pressurization-side communication ports, outlet, and depressurization-side communication ports, in succession.

Furthermore, the rotor housing is provided with pressure-regulating ports which are connected to each pocket immediately before the pocket reaches the inlet and outlet. The outlet- and inlet-side pressure-regulating ports are connected to the high-pressure container and the atmosphere side, respectively.

According to the valve apparatus described above, when a material is introduced through the inlet of the rotor housing, it is received from the inlet by one of the pockets. As the rotor rotates, thereafter, the material is carried toward the outlet of the rotor housing. The pocket, moving from the inlet toward the outlet as the rotor rotates, is connected successively to the pockets moving from the outlet toward the inlet by means of the communication ports and the equalizing pipes.

Every time each pocket moving from the inlet toward the outlet is connected to one of the pockets moving from the outlet toward the inlet, its internal pressure is increased by stages from the atmospheric pressure. When this pocket is connected to the outlet-side pressure-regulating port, its internal pressure becomes equal to the pressure in the high-pressure container. Every time each pocket moving from the outlet toward the inlet is connected to one of the pockets moving from the inlet toward the outlet, on the other hand, its internal pressure is reduced by stages from the level of the pressure in the high-pressure container. When this pocket is connected to the inlet-side pressure-regulating port, its internal pressure becomes equal to the pressure in the inlet, that is, atmospheric pressure.

Thus, when each pocket is connected to the inlet or the outlet, its internal pressure is on the same level as the inlet or outlet pressure. Accordingly, the material can be smoothly supplied from the inlet to the pockets and from the pockets to the outlet or the high-pressure container.

In consequence, according to the valve apparatus of this type, the loss of the pressure in the high-pressure container, that is, the rate of gas flow from the container through the apparatus, can be restrained as the material is continuously fed into the container.

If a gas in the high-pressure container is an inexpensive one, such as air or steam, the inlet-side pressure-regulating port may be simply opened to the atmosphere. If the handled gas is an expensive or special one, however, the gas released from the inlet-side pressure-regulating port should be collected in a recovery tank. In general, the gas recovered in the recovery tank is supplied to a booster, whereupon its pressure is increased to the level of the pressure in the high-pressure container. Thereafter, the gas is returned to the high-pressure container to be reused.

If the used gas is an expensive or special one, as described above, it should be circulated between the high-pressure container and recovery tank for the sake of economy. In order to reduce operating costs for this gas circulation, moreover, the capacity of the recovery tank and the capability of the booster should preferably be minimized.

The load on the equipment surrounding the recovery tank, booster, etc. can be lightened by only reducing the rate of gas circulation, that is, the rate of gas flow through the valve apparatus. To attain this, the pressure released through the inlet-side pressure-regulating port, that is, gas recovery pressure, must be lowered.

Every time one of the pressurization-side pockets, moving from the inlet toward the outlet, and one of the depressurization-side pockets, moving from the outlet toward the inlet, are connected to each other by means of the corresponding communication ports and equalizing pipe as the rotor rotates, their respective internal pressures are increased or reduced by stages, as mentioned before. Therefore, the gas recovery pressure, produced when each depressurization-side pocket is connected to the outlet-side pressure-regulating port, can be lowered by increasing the equalizing pipes and the communication ports in number.

If the numbers of the equalizing pipes and the communication ports are increased, however, the valve apparatus becomes more intricate in construction and bulkier, and the layout of the equalizing pipes is complicated.

SUMMARY OF THE INVENTION

The object of the present invention is to provide a rotary valve apparatus in which the rate of gas flow can be reduced without increasing the number of equalizing pipes or communication ports.

The above object is achieved by a valve apparatus of the present invention, which comprises: a rotor housing including a rotor bore defined therein, an inlet to be connected to one pressure side, out of the high- and low-pressure sides, an outlet separated from the inlet in the circumferential direction of the rotor bore and adapted to be connected to the other pressure side, a first communication port arranged in a first region extending from the inlet to the outlet and a second communication port arranged in a second region extending from the outlet to the inlet, with respect to the circumferential direction of the rotor bore, each communication port having two opposite ends; a rotor rotatably fitted in the rotor bore of the rotor housing, the rotor including an axis, an outer peripheral surface, and a plurality of pockets arranged at regular intervals in the circumferential direction on the outer peripheral surface, the pockets being adapted to move to be connected to the inlet, outlet, and one end of each communication port, individually, as the rotor rotates; connecting means for connecting the respective other ends of the first and second communication ports to each other; first supply means for supplying each pocket with a pressure equal to the pressure in the inlet immediately before the pocket is connected to the inlet as the rotor rotates; second supply means for supplying each pocket with a pressure equal to the pressure in the outlet immediately before the pocket is connected to the outlet as the rotor rotates; and pressure equalizing means for allowing the connecting means successively to connect each pocket on one side corresponding to first pockets moving from the inlet to the outlet or second pockets moving from the outlet to the inlet to the adjacent pockets on the other side as the rotor rotates.

According to the valve apparatus described above, each of the first or second pockets is connected successively to the second or first pockets on the other side by means of the connecting means while it is connected to its corresponding communication port as the rotor rotates. Thus, each first pocket is connected to the individual second pockets, and the respective internal pressures of the first and second pockets are equalized with every cycle of connection. Likewise, each second pocket is connected to the individual first pockets, and the respective internal pressures of the first and second pockets are equalized with every cycle of connection.

In the case where the connecting means includes equalizing pipes, each of the first and second pockets is subjected to a plurality of cycles of pressure equalization by means of one equalizing pipe. Thus, the stages of increase and reduction of the pressures in the pockets can be increased in number without adding to the equalizing pipes.

In the case of the valve apparatus of the present invention, therefore, the pressure supplied to each pocket from the depressurization-side supply means, out of the first and second supply means, that is, the final pressure or recovery pressure released from the pocket through the depressurization-side supply means, can be reduced. Thus, the amount of gas flowing through the valve apparatus is lessened, so that the load on the peripheral equipment of the valve apparatus can be reduced considerably.

Since the recovery pressure from the valve apparatus can be lowered with use of fewer equalizing pipes, moreover, the layout of these pipes is easy, and the size of the valve apparatus can be reduced.

The pressure equalizing means can be obtained by uniquely arranging the first and second communication ports. More specifically, the communication ports may be arranged so that the adjacent second pockets are connected successively to one of the communication ports while one of the first pockets is connected to the other communication port as the rotor rotates.

The circumference of each pocket of the rotor may be airtightly sealed by means of seal means. Preferably, in this case, the rotor housing further includes a pair of side chambers defined individually on both sides of the rotor with respect to the axial direction of the rotor and subjected to a predetermined pressure, the rotor bore and the rotor are tapered, and the rotor is supported for displacement in the axial direction and includes a small-diameter end face, subjected to the pressure from one of the side chambers, and a large-diameter end face, having a pressure bearing area larger than that of the small-diameter end face and subjected to the pressure from the other side chamber.

In this case, the rotor is continually pressed or urged toward the small-diameter end side, depending on the difference between the respective pressure bearing areas of the small- and large-diameter end faces. If the seal means is worn, therefore, the rotor shifts its position toward the small-diameter end side, so that the rotor and the rotor housing are brought intimately into contact with each other with the seal means between them. Thus, the sealing performance of the seal means can be maintained for a long period of time.

Preferably, moreover, a pressure supplied to the pair of side chambers is adjusted to the maximum pressure supplied to the pockets of the rotor. In this case, the pair of side chambers, in cooperation with the seal means, effectively prevent the loss of pressure in each pocket.

A meshed screen may be arranged in each of the communication ports. The screen serves to prevent a material from flowing out of the pockets when the first and second pockets are connected to one another by means of the first and second communication ports and the equalizing pipe.

The rotor housing may further include a pair of communication ports, besides the aforesaid first and second communication ports, the valve apparatus further comprises second connecting means for connecting the pair of communication ports to each other, and second pressure equalizing means for allowing the second connecting means successively to connect each pocket on one side corresponding to first or second pockets to the adjacent pockets on the other side as the rotor rotates.

BRIEF DESCRIPTION OF THE DRAWINGS

The present invention will become more fully understood from the detailed description given herein below and the accompanying drawings which are given by way of illustration only, and thus, are not limitative of the present invention, and wherein.

DETAILED DESCRIPTION OF THE PREFERRED EMBODIMENTS

Figure 1:
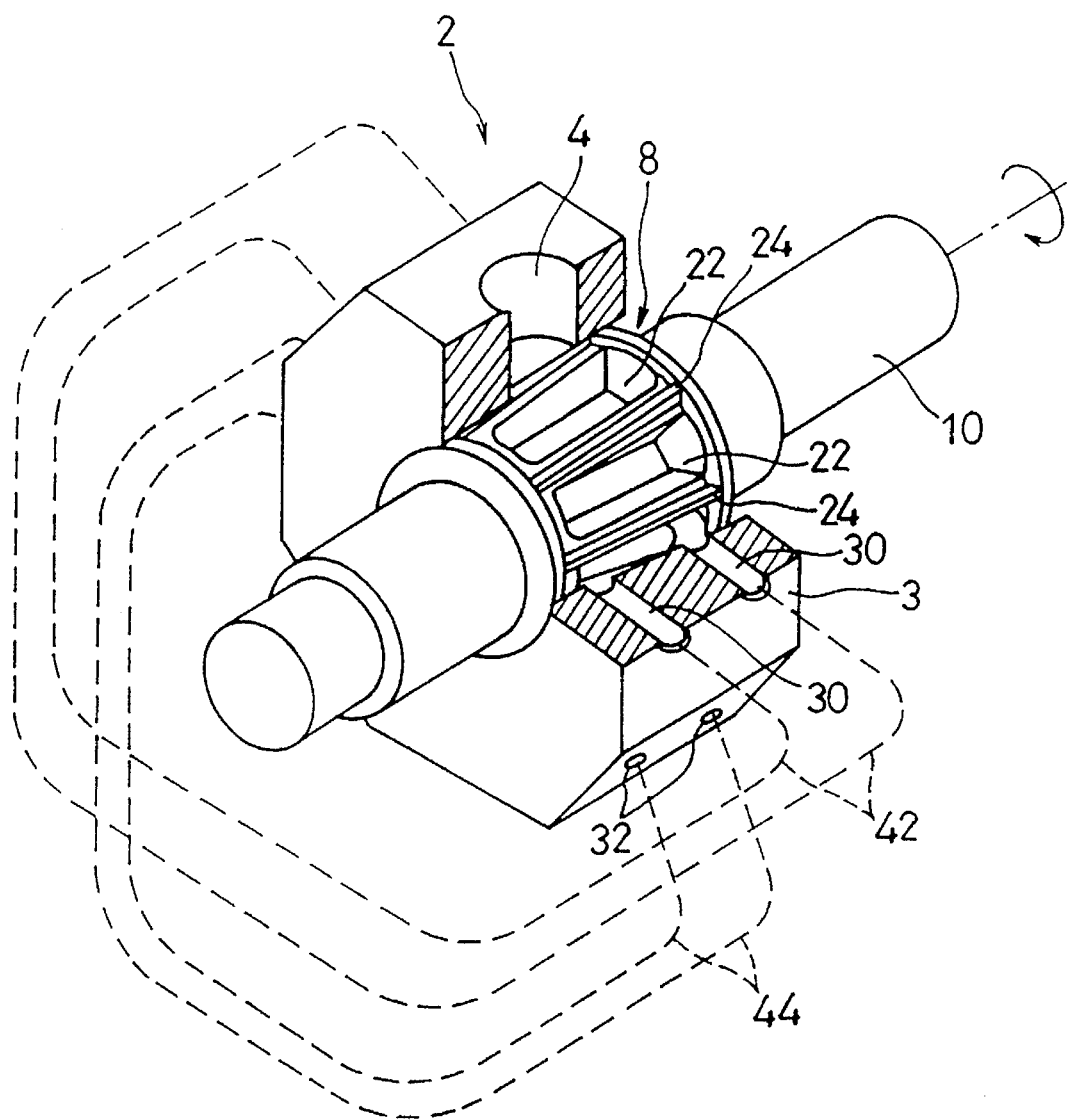
FIG. 1 is a cutaway perspective view of a valve apparatus according to one embodiment of the present invention.

Referring to FIG. 1, there is shown a rotary valve apparatus which comprises a rotor housing 2. The rotor housing 2 has a rotor bore defined therein, an inlet 4, and an outlet 6. The inlet 4 and the outlet 6 are located above and below, respectively. The outlet 6 is not shown in FIG. 1.

A rotor 8 is contained for rotation in the rotor bore of the rotor housing 2. The rotor 8 has a rotor shaft 10, both ends of which are rotatably supported on the rotor housing 2.

Figure 2:
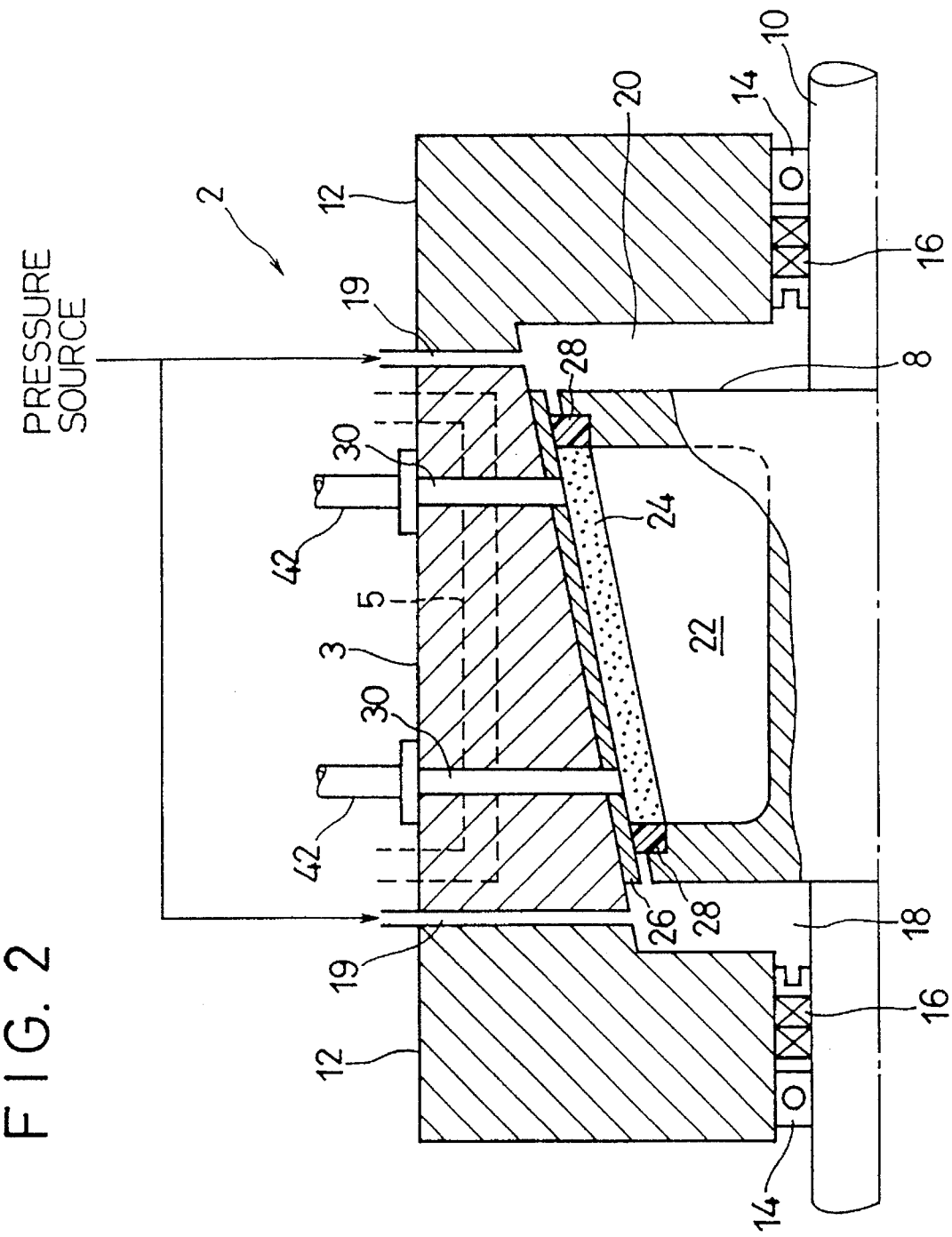
FIG. 2 is a cutaway longitudinal sectional view of the valve apparatus shown in FIG. 1.

Referring to FIG. 2, the construction of the rotor housing 2 is shown further in detail. The housing 2 includes a housing body 3 surrounding the rotor 8 and a pair of end walls 12 on either side of the body 3. These end walls 12 define a pair of side chambers 18 and 20 on either side of the rotor 8, in the rotor housing 2.

The opposite ends of the rotor shaft 10 are supported individually on the end walls 12 by means of their corresponding bearings 14 for rotation and axial displacement. A seal 16 is interposed between each end wall 12 and the rotor shaft 10 so as to be situated nearer to the rotor 8 than its corresponding bearing 14 is. The seals 16 serve to keep their corresponding side chambers 18 and 20 airtight.

One end of the rotor shaft 10 is connected to a drive source (not shown), and the rotor 8 is rotated in one direction at a constant speed by the drive source.

As seen from FIGS. 1 and 2, the rotor 8 is tapered, and has a plurality of pockets 22 formed on its outer peripheral surface. These pockets 22 are arranged at intervals in the circumferential direction of the rotor 8. Also, a plurality of vane seals 24 are attached to the outer peripheral surface of the rotor 8. Each vane seal 24 is located between each two adjacent pockets 22.

A liner 26 is mounted on the inner surface of the housing body 3. As the rotor 8 rotates, the vane seals 24 move in sliding contact with the liner 26. A pair of side seals 28 are attached individually to small- and large-diameter ends of the rotor 8. The seals 28 are connected individually to the opposite ends of each vane seal 24 in an airtight manner. As the rotor 8 rotates, moreover, the side seals 28 move airtightly in sliding contact with the liner 26 of the housing body 3. Thus, the pockets 22 of the rotor 8 are defined airtightly by the vane seals 24, liner 26, and side seals 28.

The side chambers 18 and 20 are connected to a pressure source through their corresponding passages which extend in the rotor housing 2. Thus, the chambers 18 and 20 can be supplied with pressure from the pressure source. The pressure in each side chamber is adjusted to the maximum pressure supplied to the pockets 22.

The large-diameter end of the rotor 8 has an effective pressure bearing area larger than that of the small-diameter end. Accordingly, when the pressures in the side chambers 18 and 20 act on the small- and large-diameter ends of the rotor 8, the rotor 8 is subjected to a force directed to the small-diameter end side. Even if the vane seals 24 and the side seals 28 are worn, therefore, their sealing performance can be maintained by allowing the rotor 8 to shift its position toward the small-diameter end side.

Since the side seals 28 are also subjected to the pressures in the side chambers 18 and 20, moreover, the pressure in each pocket 22 can never get away into the chamber 18 or 20.

Figure 3:
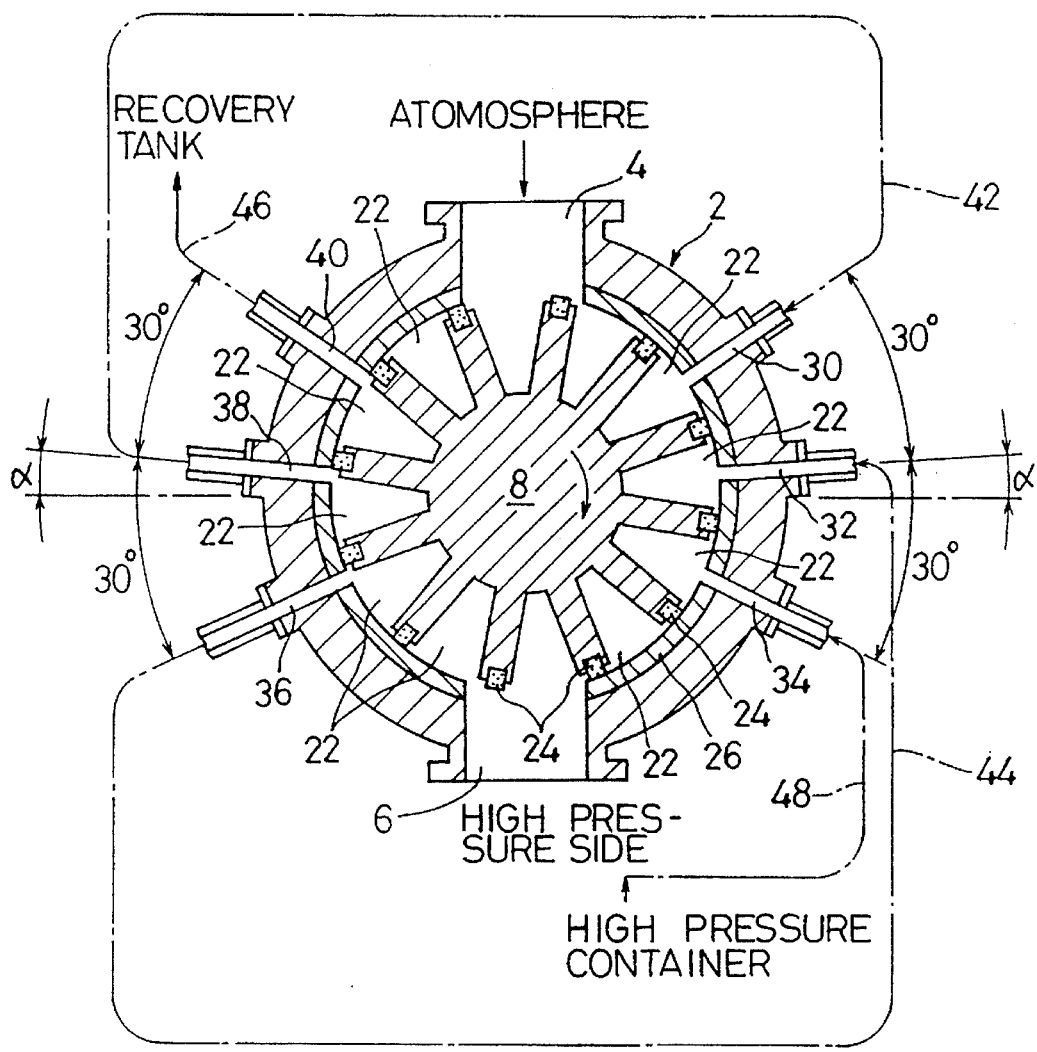
FIG. 3 is a cross-sectional view of the valve apparatus shown in FIG. 1.

As seen from FIG. 3, the pockets 22 on the outer peripheral surface of the rotor 8 are 12 in number, for example. In this case, therefore, the pockets 22 are arranged at regular intervals of 30° on the rotor surface.

Although the rotor housing 2 shown FIG. 3 is different in shape from the one shown in FIG. 1, this is intended for ease of illustration only. More specifically, the rotor housing 2 may be formed having any desired external shape, and is only expected to have a tapered bore which can contain the rotor 8 for rotation therein.

As shown in FIG. 3, the inlet 4 and the outlet 6 of the rotor housing 2 are separated in the diametrical direction of the rotor 8. In this embodiment, the inlet 4 is open to the low-pressure side or the atmosphere, and the outlet 6 is connected to the high-pressure side or a high-pressure container (not shown). In this case, the rotor 8 is rotated in the clockwise direction indicated by the arrow in FIG. 3.

Figure 4:
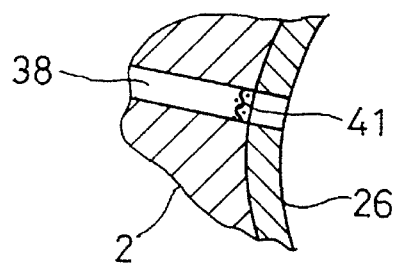
FIG. 4 is an enlarged view corresponding to part of FIG. 3.

Two communication ports 30 and 32 and a pressure-regulating port 34 are formed successively in that portion of the wall of the rotor housing 2 which extends from the inlet 4 to the outlet 6 with respect to the rotating direction of the rotor 8. Likewise, two communication ports 36 and 38 and a pressure-regulating port 40 are formed successively in that portion of the housing wall which extends from the outlet 6 to the inlet 4. One end of each of these ports penetrates the liner 26 and opens into the rotor housing 2. As shown in FIG. 4, for example, a screen 41 is attached to the open end portion of each port. The screen 41 has a meshed structure, and its mesh size is smaller than a material supplied to each pocket 22.

Each of the distances between the respective open ends of the communication ports 30 and 32, between those of the communication port 32 and the pressure-regulating port 34, between those of the communication ports 36 and 38, and between those of the communication port 38 and the pressure-regulating port 40 is equal to the distance between each two adjacent vane seals 24, with respect to the rotating direction of the rotor 8. More specifically, the pressurization-side ports 30, 32 and 34 situated between the inlet 4 and the outlet 6, with respect to the rotating direction of the rotor 8, are arranged at regular intervals of 30° in the circumferential direction of the rotor 8. Likewise, the depressurization-side ports 36, 38 and 40 situated between the outlet 6 and the inlet 4 are arranged at regular intervals of 30° in the circumferential direction of the rotor 8.

Thus, each pocket 22 cannot be connected simultaneously to two adjacent ports on the pressurization or depressurization side during the rotation of the rotor 8.

The pressurization-side ports 30, 32 and 34 and their corresponding depressurization-side ports 36, 38 and 40 are arranged symmetrically with respect to a vertical plane which connects the inlet 4 and the outlet 6 of the rotor housing 2. However, the arrangement of the ports 30 to 40 is not symmetrical with respect to a horizontal plane which contains the axis of the rotor 8.

More specifically, the communication ports 32 and 38 are displaced toward the inlet 4 by a predetermined angle α (e.g., 5°) from the aforesaid horizontal plane, as shown in FIG. 3. When the pressurization-side ports 30, 32 and 34 are closed individually by the vane seals 24 of the rotor 8, therefore, the depressurization-side ports 36, 38 and 40 are connected to their corresponding pockets 22.

This indicates that the angular positions of the rotor 8 where the pressurization-side ports 30, 32 and 34 are connected individually to the pockets 22 is different from the angular positions where the depressurization-side ports 36, 38 and 40 are connected individually to the pockets 22.

As indicated by dashed line in FIG. 3, the communication ports 30 and 38 are connected to each other by means of an equalizing pipe 42, and the communication ports 32 and 36 are also connected to each other by means of an equalizing pipe 44. The pressure-regulating port 40 on the inlet side is connected to a recovery tank, which shares the pressure with the inlet 4, by means of a connecting pipe 46, and the pressure-regulating port 34 on the outlet side is connected to the aforesaid high-pressure container by means of a connecting pipe 48. The recovery tank is connected to the high-pressure container through a booster (not shown).

As seen from FIGS. 1 and 2, each of the ports 30, 32, 34, 36, 38 and 40 has its own counterpart, so that each of the equalizing pipes 42 and 44 also has one. Each pair of ports are spaced in the axial direction of the rotor 8, and can communicate with the pockets 22. As indicated by broken line in FIG. 2, moreover, a cooling passage 5 is formed in the body 3 of the rotor housing 2.

The following is a description of the operation of the valve apparatus described above.

If the pressure in the high-pressure container is $P_H$ in terms of the gauge pressure, the pressure $P_H$ is continually supplied to the outlet 6. Since the inlet 4 is open to the atmosphere, as mentioned before, the pressure in the inlet 4 is always 0 in terms of the gauge pressure. Accordingly, the internal pressure of the pocket 22 connected to the outlet 6 is $P_H$, while that of the pocket 22 connected to the inlet 4 is 0.

As mentioned before, the valve apparatus is provided with the equalizing pipes 42 and 44. As the rotor 8 rotates, therefore, one pocket 22 which moves from the outlet 6 toward the inlet 4 communicates with another pocket 22 which moves from the inlet 4 toward the outlet 6, by means of the corresponding equalizing pipe and communication ports, whereupon the respective internal pressures of the two pockets 22 become equal. Thus, the internal pressure of the pocket 22 moving from the outlet 6 toward the inlet 4 is reduced by stages, and in contrast with this, that of the pocket 22 moving from the inlet 4 toward the outlet 6 is increased by stages.

As mentioned before, the angular positions of the rotor 8 where the pressurization-side ports 30, 32 and 34 are connected individually to the pockets 22 is different from the angular positions where the depressurization-side ports 36, 38 and 40 are connected individually to the pockets 22. As the rotor 8 rotates, therefore, each depressurization-side pocket 22 moving from the outlet 6 toward the inlet 4 is subjected to two cycles of depressurization for each equalizing pipe, while each pressurization-side pocket 22 moving from the inlet 4 toward the outlet 6 is subjected to two cycles of pressurization for each equalizing pipe.

Thus, as the rotor 8 rotates, each depressurization-side pocket 22 communicates with two of the pressurization-side pockets 22 by means of one and the same equalizing pipe, while each pressurization-side pocket 22 also communicates with two of the depressurization-side pockets 22 by means of the same equalizing pipe. Each depressurization-side pocket 22 is connected to the pressure-regulating port 40 before it is connected to the inlet 4, and each pressurization-side pocket 22 is connected to the pressure-regulating port 34 before it is connected to the outlet 6.

Thus, in the case of the valve apparatus of the present embodiment, which is provided with the two equalizing pipes 42 and 44, each depressurization-side pocket 22 is subjected to five cycles of depressurization in total as it moves from the outlet 6 to the inlet 4, and each pressurization-side pocket 22 is also subjected to five cycles of pressurization in total as it moves from the inlet 4 to the outlet 6. In this manner, the pressure in each depressurization-side pocket 22 is reduced in five stages of depressurization, while the pressure in each pressurization-side pocket 22 is increased in five stages of pressurization.

Figure 5:
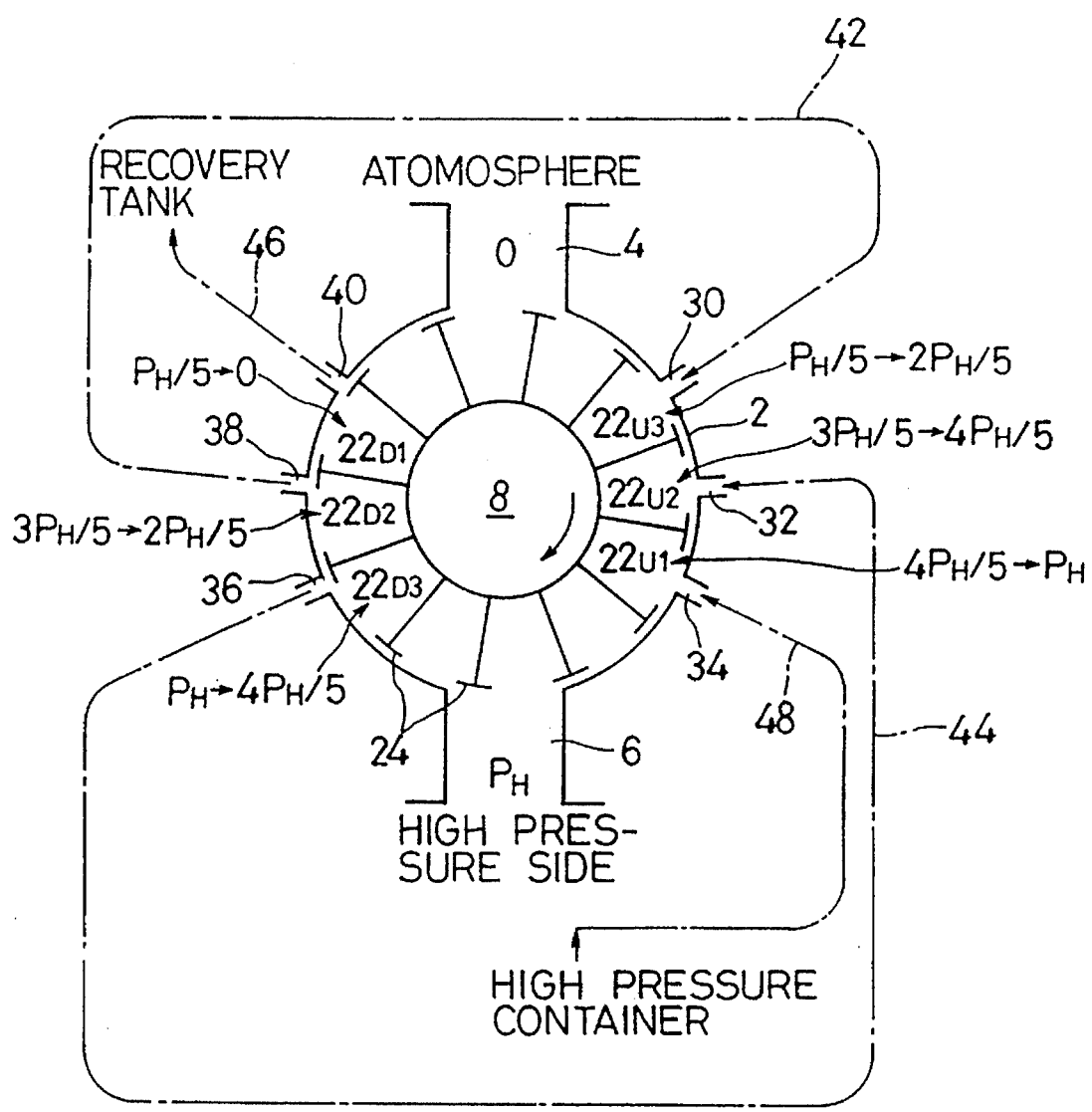
FIG. 5 is a schematic view showing the valve apparatus with a rotor in a predetermined angular position.

Immediately before a depressurization-side pocket $22_{D1}$ is connected to the pressure-regulating port 40, therefore, its internal pressure is reduced to ⅕ of the pressure $P_H$ in the outlet 6, as shown in FIG. 5. When the pocket $22_{D1}$ is connected to the connecting pipe 46 through the port 40, thereafter, its internal pressure $PH_H/5$ is reduced to 0.

Immediately before a pressurization-side pocket $22_{U1}$ is connected to the pressure-regulating port 34, on the other hand, its internal pressure is increased from $3P_H/5$ to $4P_H/5$. When the pocket $22_{U1}$ is connected to the high-pressure container through the port 34 and the connecting pipe 48, thereafter, its internal pressure $P_H/5$ is increased from $4P_H/5$ to $P_H$.

In the state shown in FIG. 5, depressurization-side pockets $22_{D2}$ and $22_{D3}$ which follow the pocket $22_{D1}$, with respect to the rotating direction of the rotor 8, are connected to the communication ports 38 and 36, respectively. Likewise, pressurization-side pockets $22_{U2}$ and $22_{U3}$ which follow the pocket $22_{U1}$ are connected to the communication ports 32 and 30, respectively. Accordingly, the pockets $22_{D2}$ and $22_{D3}$ communicate with the pockets $22_{U3}$ and $22_{U2}$ by means of the equalizing pipes 42 and 44, respectively, so that the respective internal pressures of the depressurization- and pressurization-side pockets 22 communicating with one another are equalized.

Supposing that the rotor 8 in the state shown in FIG. 5 is rotated backward for a certain angle, with attention given to the depressurization-side pocket $22_{D2}$ and the pressurization-side pocket $22_{U3}$, it can be understood that the pocket $22_{U3}$ communicates with the pocket $22_{D1}$ by means of the equalizing pipe 42 immediately before it starts to communicate with the pocket $22_{D2}$ by means of the same equalizing pipe 42. Accordingly, the internal pressure of the pocket $22_{U3}$ is increased from 0 to $P_H/5$, the same level as that of the pocket $22_{D1}$, immediately before the pocket $22_{U3}$ is connected to the pocket $22_{D2}$. When the pocket $22_{U3}$ communicates again with the pocket $22_{D2}$ by means of the same equalizing pipe 42, thereafter, its internal pressure is further increased. More specifically, the internal pressure of the pocket $22_{U3}$ is increased from $P_H/5$ to $2P_H/5$. This indicates that the internal pressure of the pocket $22_{D2}$ is reduced from $3P_H/5$ to $2P_H/5$.

The same applies to the combination of the depressurization-side pocket $22_{D3}$ and the pressurization-side pocket $22_{U2}$. Immediately before the pocket $22_{U2}$ starts to communicate with the pocket $22_{D3}$ by means of the equalizing pipe 44, it communicates with the pocket $22_{D2}$ by means of the same equalizing pipe 44, so that the internal pressure of the pocket $22_{U2}$ is on the same level as that of the pocket $22_{D2}$. Thus, when the pocket $22_{U2}$ communicates again with the pocket $22_{D3}$ by means of the equalizing pipe 44, thereafter, its internal pressure is increased from $3P_H/5$ to $4PH/5$, while the internal pressure of the pocket $22_{D3}$ is reduced from $P_H$ to $4P_H/5$.

Figure 6:
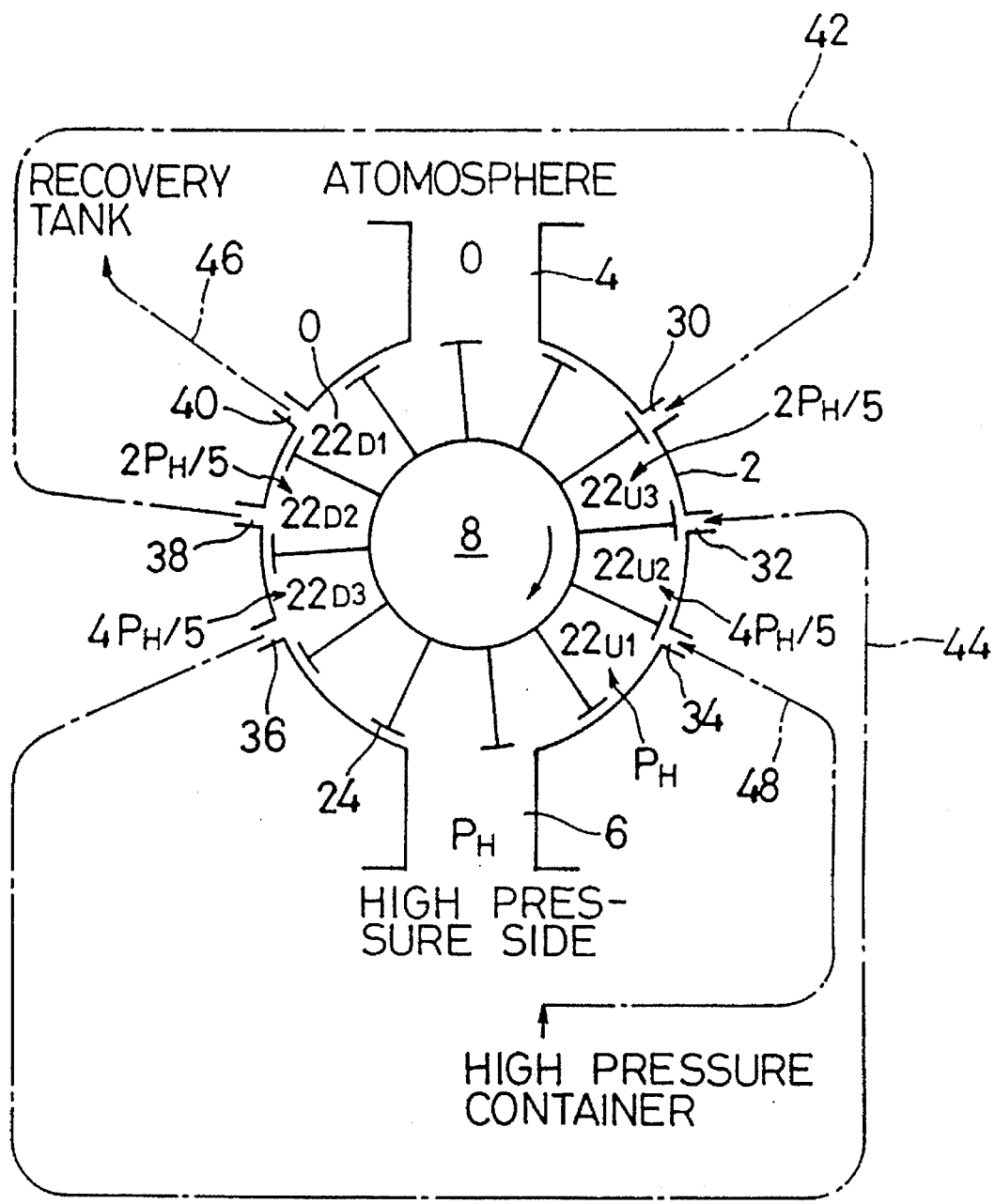
FIG. 6 is a diagram showing a state in which the rotation of the rotor is advanced from the state of FIG. 5.

When the rotor 8 rotates from the state of FIG. 5 to the state shown in FIG. 6, the pressurization-side ports 30, 32 and 34 are closed by their corresponding vane seals 24 of the rotor 8, although the depressurization-side ports 36, 38 and 40 are open. At this point of time, therefore, the equal-pressure relation between the pressurization- and depressurization-side pockets $22_D$ and $22_U$ terminates.

Figure 7:
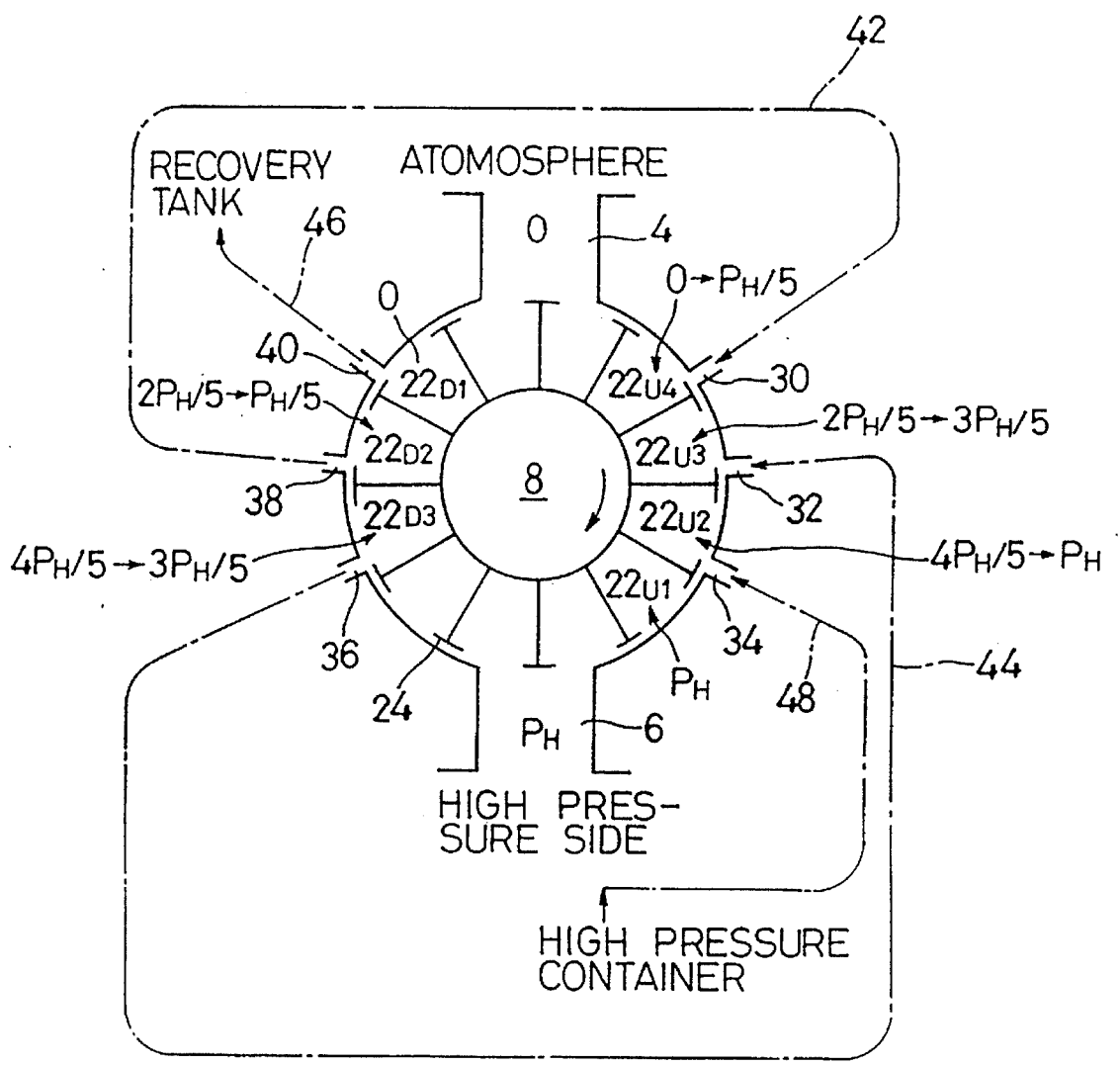
FIG. 7 is a diagram showing a state in which the rotation of the rotor is advanced from the state of FIG. 6.

When the rotor 8 further rotates from the state of FIG. 6 to the state shown in FIG. 7, thereafter, the depressurization-side pocket $22_{D3}$ communicates with the pressurization-side pocket $22_{U3}$ by means of the equalizing pipe 44, and the pocket $22_{D2}$ communicates with the pressurization-side pocket $22_{U4}$, which directly follows the pocket $22_{U3}$, by means of the equalizing pipe 42. Thus, the pockets $22_{D2}$ and $22_{D3}$ are subjected again to depressurization through the same equalizing pipes 42 and 44, respectively, while the pocket $22_{U3}$ is subjected again to pressurization.

On the depressurization side, as shown in FIG. 7, the respective internal pressures of the pockets $22_{D2}$ and $22_{D3}$ are reduced from $2P_H/5$ to $P_H/5$ and from $4P_H/5$ to $3P_H/5$, respectively. On the pressurization side, the respective internal pressures of the pockets $22_{U3}$ and $22_{U4}$ are increased from $2P_H/5$ to $3P_H/5$ and from 0 to $P_H/5$, respectively. The pocket $22_{U2}$ which precedes the pocket $22_{U3}$ is connected to the pressure-regulating port 34, and its internal pressure is increased from $4P_H/5$ to $P_H$.

Figure 8:
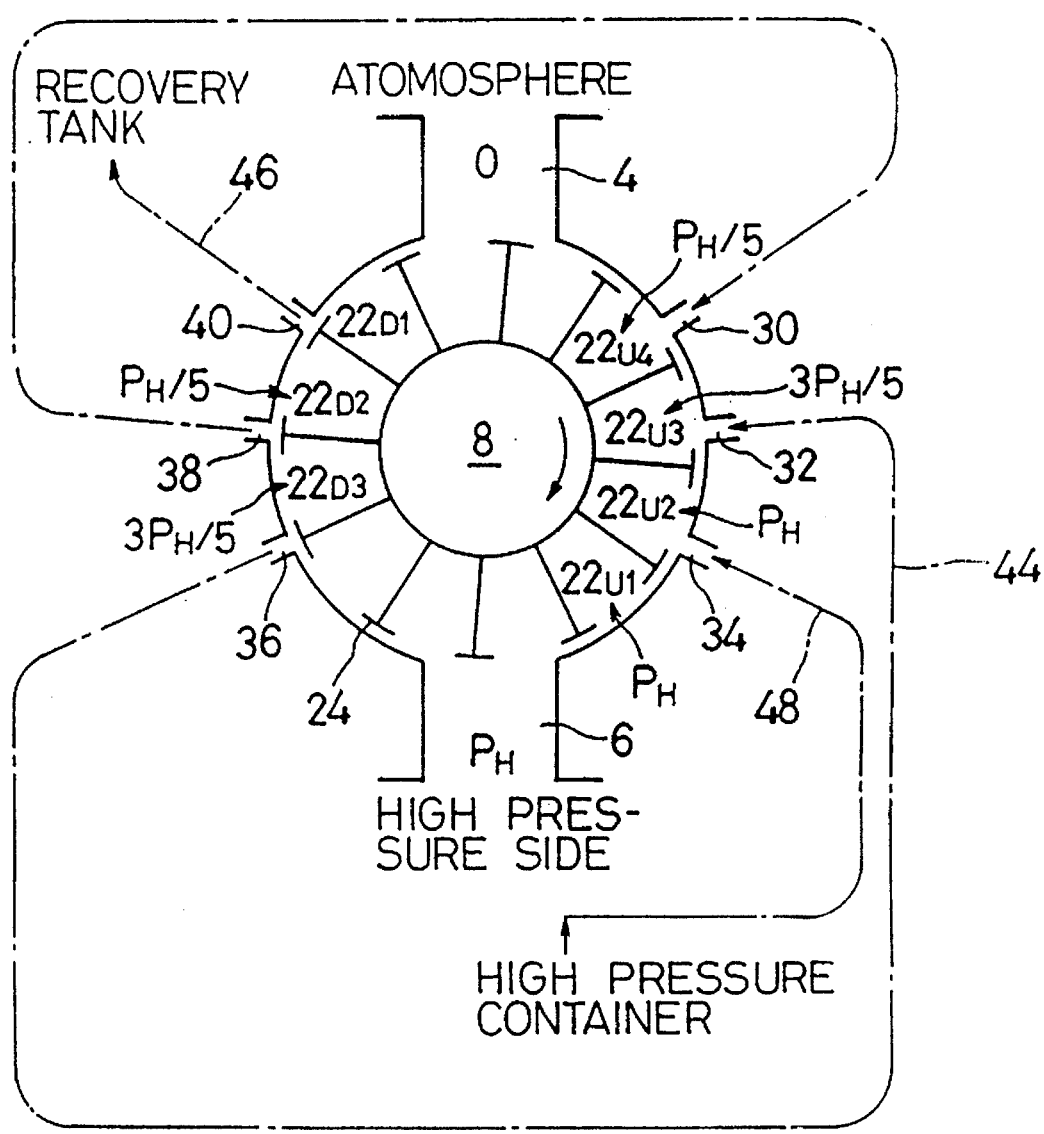
FIG. 8 is a diagram showing a state in which the rotation of the rotor is advanced from the state of FIG. 7.

When the rotor 8 rotates from the state of FIG. 7 to the state shown in FIG. 8, the depressurization-side ports 36, 38 and 40 are closed by their corresponding vane seals 24 of the rotor 8, although the pressurization-side ports 30, 32 and 34 are open. At this time, the equal-pressure relation between the pressurization- and depressurization-side pockets $22_D$ and $22_U$ terminates.

As the rotor 8 continues the rotation, thereafter, the individual pockets 22 move so that the states or processes shown in FIGS. 5 to 8 are repeated in succession. As the rotor 8 rotates, therefore, the respective internal pressures of the pressurization-side pockets $22_U$, moving from the inlet 4 toward the outlet 6, are successively increased by stages, while the respective internal pressures of the depressurization-side pockets $22_D$, moving from the outlet 6 toward the inlet 4, are successively reduced by stages.

Figure 9:
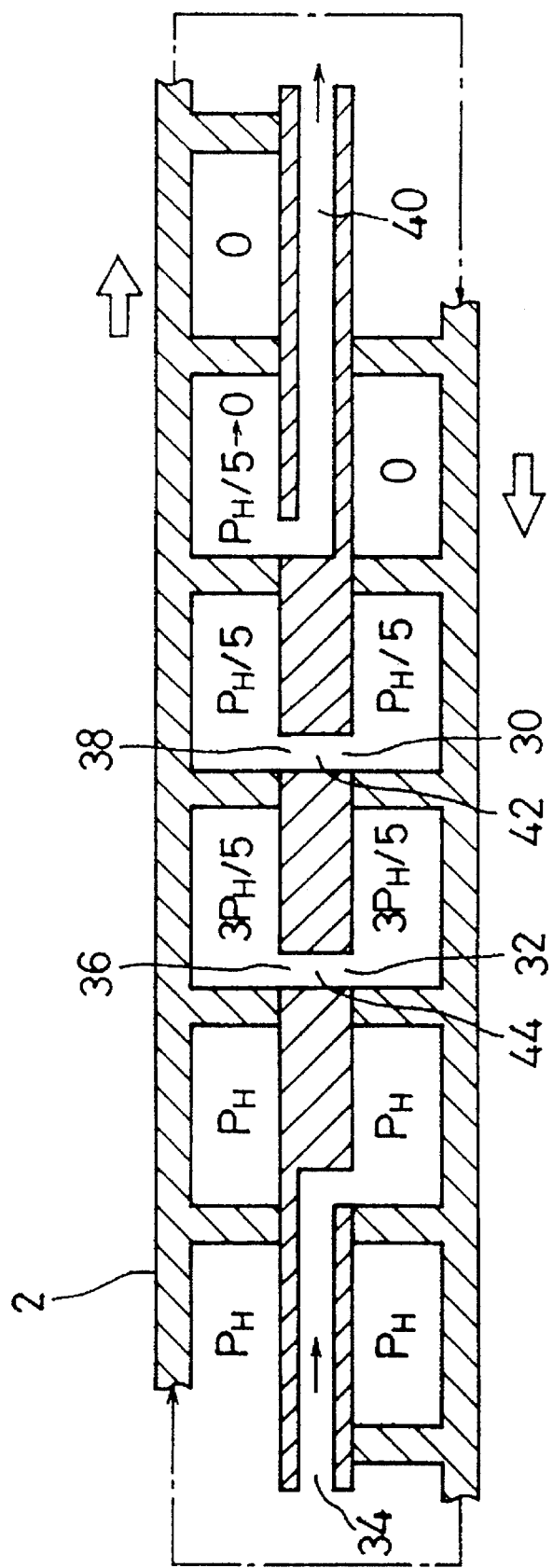
FIG. 9 is a schematic sectional view of the valve apparatus arranged so that compression-side pockets and decompression-side pockets face one another.
Figure 10:
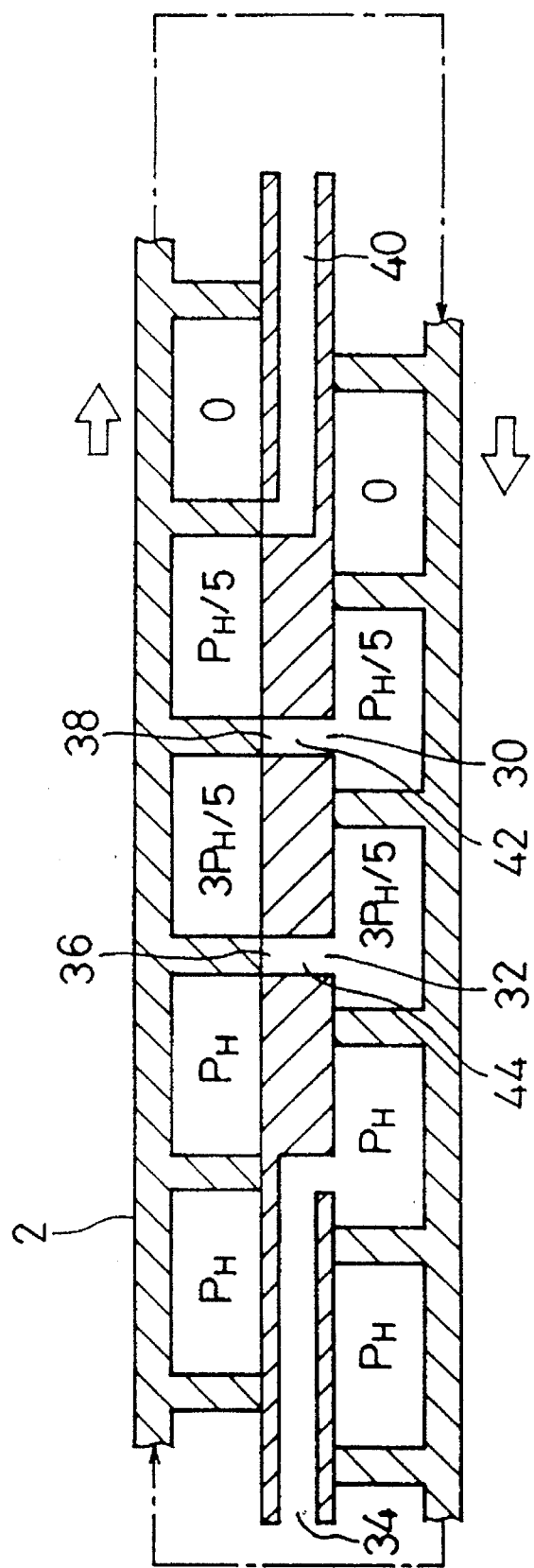
FIG. 10 is a sectional view showing a state in which the rotation of the rotor is advanced from the state of FIG. 9.
Figure 11:
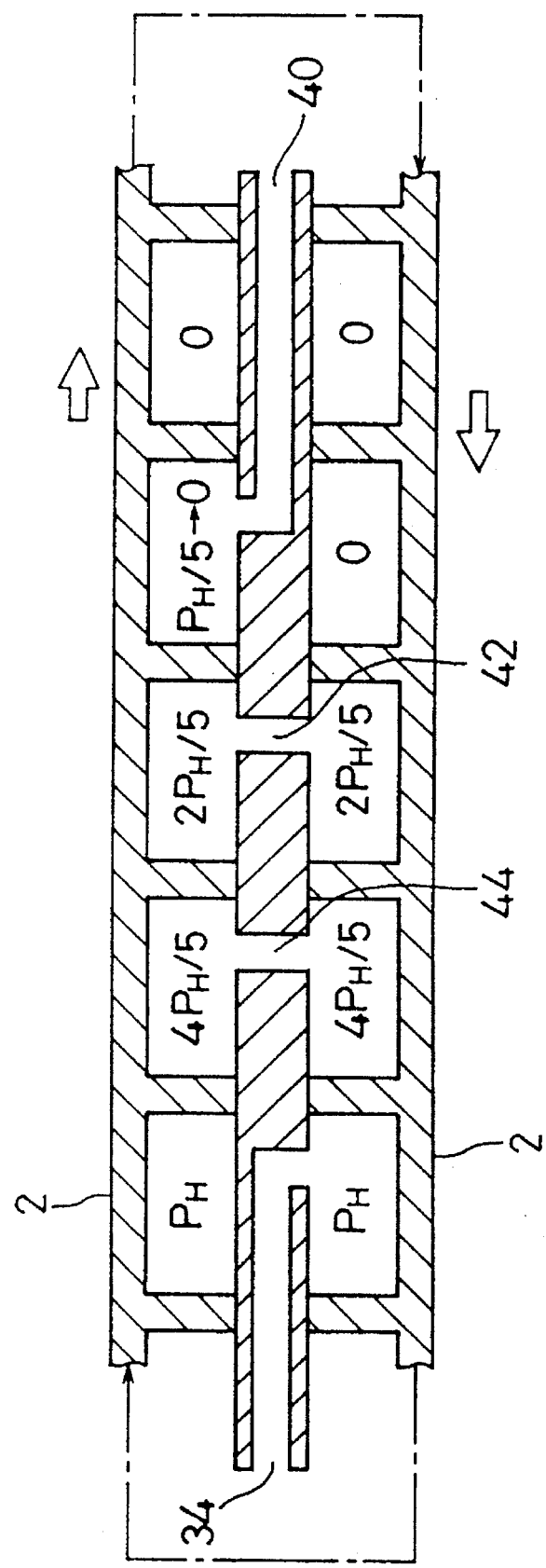
FIG. 11 is a sectional view showing a state in which the rotation of the rotor is advanced from the state of FIG. 10.

For a better understanding of the aforementioned pressure equalization, FIGS. 9, 10 and 11 illustrate the valve apparatus in an expedient form such that the pressurization-side pockets face the depressurization-side pockets, individually. In this case, the pressurization and depressurization-side pockets are supposed to move straight in opposite directions as the rotor 8 rotates. In FIGS. 9 to 11, the dashed lines indicate that the pockets repeatedly move from the pressurization side to the depressurization side and from the depressurization side to the pressurization side as the rotor 8 rotates.

Referring to FIG. 9, two depressurization-side pockets and two pressurization-side pockets corresponding thereto are equalized in pressure. In this case, the differential pressure between the adjacent pockets is $2P_H/5$. This state is equivalent to the state of FIG. 7.

When the rotor 8 rotates from the state of FIG. 9 to the state of FIG. 11 via the equalization end state shown in FIG. 10, the depressurization-side pocket at the pressure $3P_H/5$ and the pressurization-side pocket at the pressure $P_H/5$ communicate with each other, so that the respective internal pressures of these pockets are equalized at $2P_H/5$. On the other hand, the depressurization-side pocket at the pressure $P_H$ and the pressurization-side pocket at the pressure $3P_H/5$ communicate with each other, so that the respective internal pressures of these pockets are equalized at $4P_H/5$.

As the rotor 8 further rotates, thereafter, it advances from the state of FIG. 11 to the equal-pressure state shown in FIG. 8 via the equalization end state. Thereupon, the aforementioned pressure equalization is repeated as the rotor 8 rotates.

The following is a description of the form of application of the valve apparatus described above.

As the rotor 8 rotates, the material supplied through the inlet 4 of the rotor housing 2 is received by that pocket 22 which is connected to the inlet 4. Since the internal pressure of the pocket 22 connected to the inlet 4 is equal to the atmospheric pressure, the material can be smoothly fed through the inlet 4 into the pocket 22.

As the rotor 8 rotates, the material received by the pocket 22 is transported toward the outlet 6.

In the process of transportation of the material, the internal pressure of each pocket 22 is increased by stages, as mentioned before, and becomes equal to the pressure in the outlet 6 immediately before the outlet 6 is reached. When the pocket 22 having received the material is connected to the outlet 6, therefore, the material is fed from the pocket 22 into the high-pressure container through the outlet 6 by gravity.

Thereafter, the empty pocket 22, having passed the outlet 6, moves toward the inlet 4. In this process of movement, the internal pressure of the pocket 22 is reduced by stages to the level of the atmospheric pressure, and the pocket 22 is connected again to the inlet 4. Thus, with use of the rotary valve apparatus constructed in this manner, the high-pressure container can be sealed under pressure as it is continuously supplied with the material.

As seen from the description with reference to FIGS. 5 to 8 and FIGS. 9 to 11, each pocket 22 of the valve apparatus is subjected to five cycles of pressure equalization in each of the processes of movement from the inlet 4 to the outlet 6 and from the outlet 6 to the inlet 4 by means of the two equalizing pipes 42 and 44. Accordingly, the pressure released from each depressurization-side pocket $22_D$ to the recovery tank side through the pressure-regulating port 40, that is, the gas recovery pressure, can be reduced from $P_H$ to $P_H/5$, as mentioned before.

In the case of the conventional valve apparatus in which each pressurization-side pocket $22_U$ communicates with only one depressurization-side pocket $22_D$ by means of each equalizing pipe as the rotor 8 rotates, each pressurization- or depressurization-side port is subjected to only three cycles of pressure equalization in total. In this case, therefore, the recovery pressure can be reduced only from $P_H$ to $P_H/3$.

Thus, according to the valve apparatus of the present invention, the recovery pressure can be reduced to 3/5 of that for the conventional valve apparatus. Likewise, the supply pressure applied to each pocket 22 through the pressure-regulating port 34 is reduced to 3/5 of that for the conventional apparatus.

In consequence, according to the valve apparatus of the present invention, the loss of the pressure supplied from the high-pressure container side, that is, the rate of gas flow through the apparatus, can be reduced substantially, so that the loads on the recovery tank and the booster can be lightened considerably.

When each pressurization-side pocket is connected to each depressurization-side pocket through each equalizing pipe, or when each pressurization-side pocket is connected to the pressure-regulating port 34, moreover, the differential pressure between the connected portions can be made lower than in the conventional case. When each pressurization-side port is opened, therefore, the impact of the gas flow acting on each corresponding vane seal can be reduced.

In each of the drawings of FIGS. 5 to 11, the values of the pressures in the individual pockets subjected to the equalization are calculated on the assumption that the capacity of each equalizing pipe is 0, and that the gas in the high-pressure container is an ideal gas whose pressure is equalized in an ideal manner. Therefore, the actual pressure values obtained in consideration of the capacity of the equalizing pipe do not accurately agree with the illustrated values. By properly setting the equalizing pipe capacity in consideration of the time required for the pressure equalization, however, actual pressure values in the individual pockets 22 can be approximated to the illustrated values.

Table 1 below shows changes of pressure in the equalizing pipes 42 and 44 observed when the valve apparatus is operated with use of various capacity ratios between the pipes 42 and 44 and each pocket 22.

TABLE 1

| Capacity Ratio | | Pipe 42 | | Pipe 44 | | Pipe 48 |
|---|---|---|---|---|---|---|
| Vk/Vp | Pipe 46 | P1 | P2 | P3 | P4 | PH |
| 0.5 | 0 | 3.46 | 5.77 | 9.23 | 11.54 | 15 |
| 0.712 | 0 | 3.60 | 5.70 | 9.30 | 11.40 | 15 |
| 1.00 | 0 | 3.75 | 5.63 | 9.37 | 11.25 | 15 |
| 1.50 | 0 | 3.95 | 5.53 | 9.47 | 11.05 | 15 |
| 2.00 | 0 | 4.09 | 5.45 | 9.55 | 10.91 | 15 |
| 0.00 | 0 | 3.00 | 6.00 | 9.00 | 12,00 | 15 |
| PRIOR ART | 0 | 5.00 | | 10.00 | | 15 |

In Table 1, Vk and Vp represent the capacity of each equalizing pipe and that of each pocket 22, respectively, and the numerical values are given in terms of the gauge pressure.

As seen from Table 1, the pressure in the connecting pipe 48 is 15 kg/cm$^2$, which indicates that the pressure in the high-pressure container is kept at this value.

As is evident from the above description, the equalizing pipes 42 and 44 are utilized individually for the two cycles of pressure equalization for each pressurization- or depressurization-side pocket 22, so that their respective internal pressures change in two stages. Thus, in Table 1, the pressure in the pipe 42 takes a value P1 or P2, while the pressure in the pipe 44 takes a value P3 or P4.

More specifically, as shown in FIGS. 9 and 11, the pressures $P_H/5$ and $2P_H/5$ alternately develop in the equalizing pipe 42. In the case where the capacity ratio Vk/Vp is 0.5, $P_H/5$ is 3.46 kg/cm$^2$, and $2P_H/5$ is 5.77 kg/cm$^2$. Likewise, the pressures $3P_H/5$ and $4P_H/5$ alternately develop in the equalizing pipe 44. In this case, $3P_H/5$ is 9.23 kg/cm$^2$, and $4P_H/5$ is 11.54 kg/cm$^2$.

Table 1 also shows changes of pressure in the equalizing pipes 42 and 44 observed when the capacity ratio Vk/Vp is 0, that is, when the capacity of each equalizing pipe is 0, and pressures in the equalizing pipes obtained when each equalizing pipe is used in one cycle of pressure equalization for each pocket, as in the conventional case.

As the capacity ratio Vk/Vp increases, as seen from Table 1, the pressures P1 and P3 in the equalizing pipes 42 and 44 tend to increase, while the pressures P2 and P4 tend to lower. However, the aforementioned advantages can be fully enjoyed by limiting the capacity ratio Vk/Vp to a predetermined value or below.

It is to be understood that the present invention is not limited to the embodiment described above, and that various changes and modifications may be effected therein by one skilled in the art without departing from the scope or spirit of the invention. For example, the number of the equalizing pipes is not limited to two, and may alternatively be one or three or more.

Figure 12:
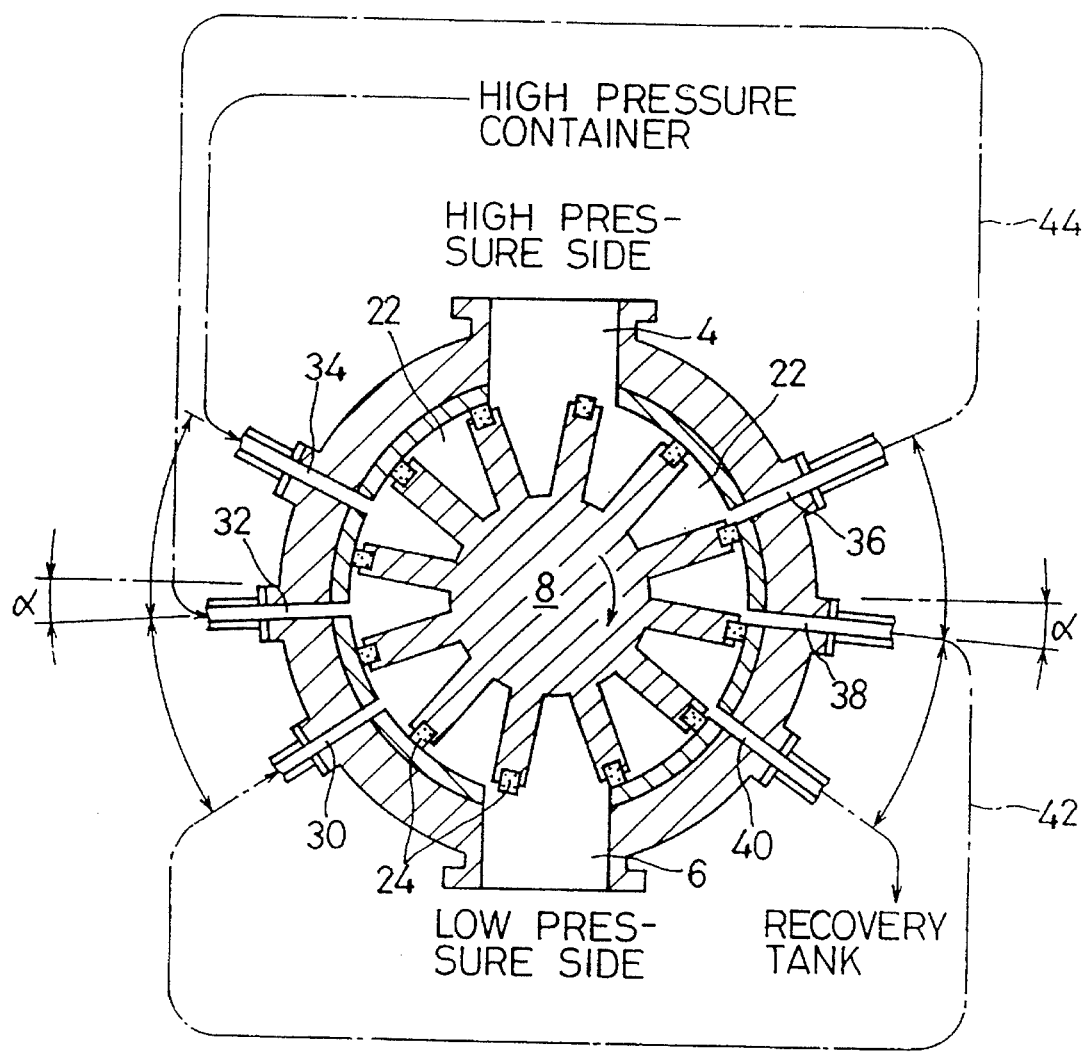
FIG. 12 is a cross-sectional view of a valve apparatus according to another embodiment.

The valve apparatus according to the above-described embodiment is used to feed the material from the lower-pressure side, e.g., atmosphere side, toward the high-pressure container. In contrast with this, however, the apparatus may be used to discharge the material from the high-pressure container to the low-pressure side. In this case, as shown in FIG. 12, the valve apparatus of FIG. 3 is arranged upside down so that the outlet 6 on the lower side is open to the atmosphere, and the depressurization- and pressurization-side communication ports 38 and 32 are displaced by an angle α toward the outlet 6 from a horizontal plane which contains the axis of the rotor 8.

What is claimed is:

1. A rotary valve apparatus comprising:

a rotor housing including a tapered rotor bore defined therein, an inlet to be connected to a low-pressure side, an outlet separated from the inlet in the circumferential direction of the rotor bore and adapted to be connected to a high-pressure side, a pair of side chambers defined at axially opposed ends of the rotor bore, each of the side chambers being subjected to a predetermined pressure, a first communication port arranged in a first region extending from the inlet to the outlet and a second communication port arranged in a second region extending from the outlet to the inlet, with respect to the circumferential direction of the rotor bore, each communication port having a first end opening into the rotor bore and a second end;

connecting means for connecting the second ends of the first and second communication ports to each other;

a tapered rotor supported for axial displacement and rotation in the rotor bore of the rotor housing, the rotor including an axis, an outer peripheral surface, a small-diameter end face exposed to the pressure in one of the side chambers, a large-diameter end face exposed to the pressure in the other side chamber, and a plurality of pockets arranged at regular intervals in the circumferential direction on the outer peripheral surface, the pockets being adapted to move to be connected to the inlet, the outlet, and the first end of each communication port, individually, as the rotor rotates, wherein each pocket moving from the inlet to the outlet is successively connected by the connecting means and the first and second communication ports to each of a pair of adjacent pockets moving from the outlet to the inlet as the rotor rotates;

seal means for gastightly separating the pockets of the rotor from each other;

first supply means for supplying each pocket with a pressure equal to a pressure in the inlet immediately before the pocket is connected to the inlet as the rotor rotates; and second supply means for supplying each pocket with a pressure equal to a pressure in the outlet immediately before the pocket is connected to the outlet as the rotor rotates.

2. The apparatus according to claim 1, wherein said first and second communication ports are arranged so that said pair of adjacent pockets moving from the outlet to the inlet are connected successively to one of said first and second communication ports while one of the pockets moving from the inlet to the outlet is connected to the other of said first and second communication ports as said rotor rotates.

3. The apparatus according to claim 1, wherein the pair of side chambers are supplied with a pressure equal to the maximum pressure supplied to the pockets of said rotor.

4. The apparatus according to claim 1, wherein each communication port has a meshed screen therein.

5. The apparatus according to claim 1, wherein said connecting means includes an equalizing pipe connecting the respective other ends of the first and second communication ports.

6. The apparatus according to claim 1, wherein said rotor housing further includes third and fourth communication ports arranged in the first and second regions of said rotor housing, respectively, and which further comprises second connecting means for connecting the third and fourth communication ports to each other, and wherein the second connecting means successively connect each pocket moving from said inlet to said outlet to a pair of adjacent pockets moving from said outlet to said inlet as said rotor rotates.

7. The rotary valve apparatus as in claim 1, wherein said seal means include vane seals and side seals fixedly connected to said rotor.

8. A rotary valve apparatus comprising:

a rotor housing including a rotor bore defined therein, an inlet to be connected to a low-pressure side, an outlet separated from the inlet in the circumferential direction of the rotor bore and adapted to be connected to a high-pressure side, a first communication port arranged in a first region extending from the inlet to the outlet and a second communication port arranged in a second region extending from the outlet to the inlet, with respect to the circumferential direction of the rotor bore, each communication port having a first end opening into the rotor bore and a second end;

connecting means for connecting the second ends of the first and second communication ports to each other;

a rotor rotatably fitted in the rotor bore of the rotor housing, the rotor including an axis, an outer peripheral surface, and a plurality of pockets arranged at regular intervals in the circumferential direction on the outer peripheral surface, the pockets being adapted to move to be connected to the inlet, the outlet, and the first end of each communication port, individually, as the rotor rotates, wherein each pocket moving from the inlet to the outlet is successively connected by the connecting means and the first and second communication ports to each of a pair of adjacent pockets moving from the outlet to the inlet as the rotor rotates;

seal means for gastightly separating the pockets of the rotor from each other;

first supply means for supplying each pocket with a pressure equal to a pressure in the inlet immediately before the pocket is connected to the inlet as the rotor rotates, the first supply means including a first pressure-regulating port formed in the rotor housing and having one end connected to the low-pressure side and the other end connectable to the pockets of the rotor; and second supply means for supplying each pocket with a pressure equal to a pressure in the outlet immediately before the pocket is connected to the outlet as the rotor rotates, the second supply means including a second pressure-regulating port formed in the rotor housing and having one end connected to the high-pressure side and the other end connectable to the pockets of the rotor.

9. The apparatus according to claim 8, wherein said first and second communication ports are arranged so that said pair of adjacent pockets moving from the outlet to the inlet are connected successively to one of said first and second communication ports while one of the pockets moving from the inlet to the outlet is connected to the other of said first and second communication ports as said rotor rotates.

10. The apparatus according to claim 8, wherein the pair of side chambers are supplied with a pressure equal to the maximum pressure supplied to the pockets of the rotor.

11. The apparatus according to claim 8, wherein each communication port has a meshed screen therein.

12. The apparatus according to claim 8, wherein the connecting means includes an equalizing pipe connecting the respective other ends of the first and second communication ports.

13. The apparatus according to claim 8, wherein the rotor housing further includes third and fourth communication ports arranged in the first and second regions of the rotor housing, respectively, and which further comprises second connecting means for connecting the third and fourth communication ports to each other, and wherein the second connecting means successively connect each pocket moving from the inlet to the outlet to a pair of adjacent pockets moving from the outlet to the inlet as the rotor rotates.

14. The apparatus according to claim 8, wherein the seal means include vane seals and side seals fixedly connected to the rotor.

15. A rotary valve apparatus comprising:

a rotor housing including a tapered rotor bore defined therein, an inlet to be connected to a high-pressure side, an outlet separated from the inlet in the circumferential direction of the rotor bore and adapted to be connected to a low-pressure side, a pair of side chambers defined at axially opposed ends of the rotor bore, each of the side chambers being subjected to a predetermined pressure, a first communication port arranged in a first region extending from the inlet to the outlet and a second communication port arranged in a second region extending from the outlet to the inlet, with respect to the circumferential direction of the rotor bore, each communication port having a first end opening into the rotor bore and a second end;

connecting means for connecting the second ends of the first and second communication ports to each other;

a tapered rotor supported for axial displacement and rotation in the rotor bore of the rotor housing, the rotor including an axis, an outer peripheral surface, a small-diameter end face exposed to the pressure in one of the side chambers, a large-diameter end face exposed to the pressure in the other side chamber, and a plurality of pockets arranged at regular intervals in the circumferential direction on the outer peripheral surface, the pockets being adapted to move to be connected to the inlet, the outlet, and the first end of each communication port, individually, as the rotor rotates, wherein each pocket moving from the inlet to the outlet is successively connected by the connecting means and the first and second communication ports to each of a pair of adjacent pockets moving from the outlet to the inlet as the rotor rotates;

seal means for gastightly separating the pockets of the rotor from each other;

first supply means for supplying each pocket with a pressure equal to a pressure in the inlet immediately before the pocket is connected to the inlet as the rotor rotates; and second supply means for supplying each pocket with a pressure equal to a pressure in the outlet immediately before the pocket is connected to the outlet as the rotor rotates.

16. The apparatus according to claim 15, wherein said first and second communication ports are arranged so that said pair of adjacent pockets moving from the outlet to the inlet are connected successively to one of said first and second communication ports while one of the pockets moving from the inlet to the outlet is connected to the other of said first and second communication ports as said rotor rotates.

17. The apparatus according to claim 15, wherein the pair of side chambers are supplied with a pressure equal to the maximum pressure supplied to the pockets of said rotor.

18. The apparatus according to claim 15, wherein each communication port has a meshed screen therein.

19. The apparatus according to claim 15, wherein said connecting means includes an equalizing pipe connecting the respective other ends of the first and second communication ports.

20. The apparatus according to claim 15, wherein said rotor housing further includes third and fourth communication ports arranged in the first and second regions of said rotor housing, respectively, and which further comprises second connecting means for connecting the third and fourth communication ports to each other, and wherein the second connecting means successively connect each pocket moving from said inlet to said outlet to a pair of adjacent pockets moving from said outlet to said inlet as said motor rotates.

21. The apparatus according to claim 15, wherein said seal means include vane seals and side seals fixedly connected to said rotor.

22. A rotary valve apparatus comprising:
a rotor housing including a rotor bore defined therein, an inlet to be connected to a high-pressure side, an outlet separated from the inlet in the circumferential direction of the rotor bore and adapted to be connected to a low-pressure side, a first communication port arranged in a first region extending from the inlet to the outlet and a second communication port arranged in a second region extending from the outlet to the inlet, with respect to the circumferential direction of the rotor bore, each communication port having a first end opening into the rotor bore and a second end;
connecting means for connecting the second ends of the first and second communication ports to each other;
a rotor rotatably fitted in the rotor bore of the rotor housing, the rotor including an axis, an outer peripheral surface, and a plurality of pockets arranged at regular intervals in the circumferential direction on the outer peripheral surface, the pockets being adapted to move to be connected to the inlet, the outlet, and the first end of each communication port, individually, as the rotor rotates, wherein each pocket moving from the inlet to the outlet is successively connected by the connecting means and the first and second communication ports to each of a pair of adjacent pockets moving from the outlet to the inlet as the rotor rotates;
seal means for gastightly separating the pockets of the rotor from each other;
first supply means for supplying each pocket with a pressure equal to a pressure in the inlet immediately before the pocket is connected to the inlet as the rotor rotates, the first supply means including a first pressure-regulating port formed in the rotor housing and having one end connected to the high-pressure side and the other end connectable to the pockets of the rotor; and
second supply means for supplying each pocket with a pressure equal to a pressure in the outlet immediately before the pocket is connected to the outlet as the rotor rotates, the second supply means including a second pressure-regulating port formed in the rotor housing and having one end connected to the low-pressure side and the other end connectable to the pockets of the rotor.

23. The apparatus according to claim 22, wherein said first and second communication ports are arranged so that said pair of adjacent pockets moving from the outlet to the inlet are connected successively to one of said first and second communication ports while one of the pockets moving from the inlet to the outlet is connected to the other of said first and second communication ports as said rotor rotates.

24. The apparatus according to claim 22, wherein the pair of side chambers are supplied with a pressure equal to the maximum pressure supplied to the pockets of the rotor.

25. The apparatus according to claim 22, wherein each communication port has a meshed screen therein.

26. The apparatus according to claim 22, wherein the connecting means includes an equalizing pipe connecting the respective other ends of the first and second communication ports.

27. The apparatus according to claim 22, wherein the rotor housing further includes third and fourth communication ports arranged in the first and second regions of the rotor housing, respectively, and which further comprises second connecting means for connecting the third and fourth communication ports to each other, and wherein the second connecting means successively connect each pocket moving from the inlet to the outlet to a pair of adjacent pockets moving from the outlet to the inlet as the motor rotates.

28. The apparatus according to claim 22, wherein the seal means include vane seals and side seals fixedly connected to the rotor.

\* \* \* \* \*